United States Patent [19]
Swift

[11] 3,750,284
[45] Aug. 7, 1973

[54] PORTABLE POWER SAW APPARATUS
[76] Inventor: Walter D. Swift, 617 E. Lee St., Thomaston, Ga.
[22] Filed: Jan. 3, 1972
[21] Appl. No.: 214,818

[52] U.S. Cl............. 30/380, 30/384, 83/820, 83/818, 83/661, 83/852, 144/73
[51] Int. Cl............. B27b 13/10, B27b 33/06
[58] Field of Search............. 143/32 D, 19 E, 19 R, 143/17 R, 17 A, 135 R; 144/73, 72; 30/380, 384; 83/820, 818, 661, 852

[56] References Cited
UNITED STATES PATENTS
1,892,246  12/1932  Mohns.................. 147/73
3,338,275  8/1967  Ehlen.................. 143/135 X
1,251,579  1/1918  Rieder.................. 144/73
427,818  5/1890  Young.................. 144/73

Primary Examiner—Donald R. Schran
Attorney—Harold D. Jones, Jr., Roger T. Frost et al.

[57] ABSTRACT

A saw generally of the keyhole or saber saw variety. The saw blade comprises an endless band driven in one direction and having a number of cutting members which are spaced apart from the plane of the band. The saw band travels along a channel, and the cutting members extend outside the channel for cutting exposure to a work piece. The saw can be connected with a conventional portable drill for motive power, or alternatively can be provided with a self-contained motor.

10 Claims, 6 Drawing Figures

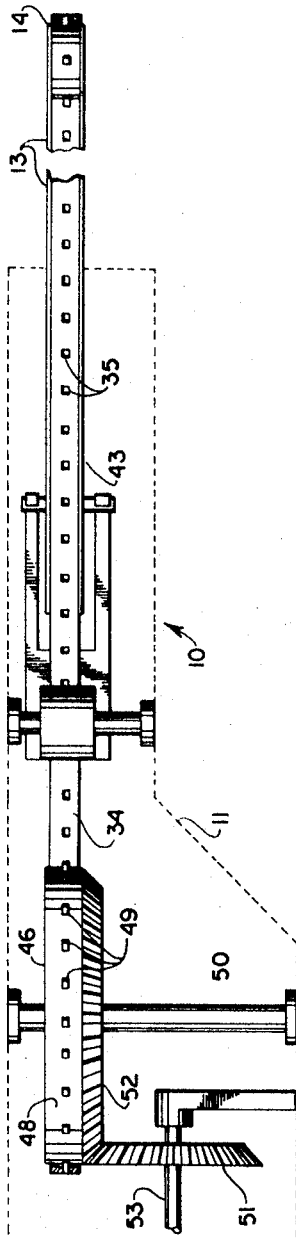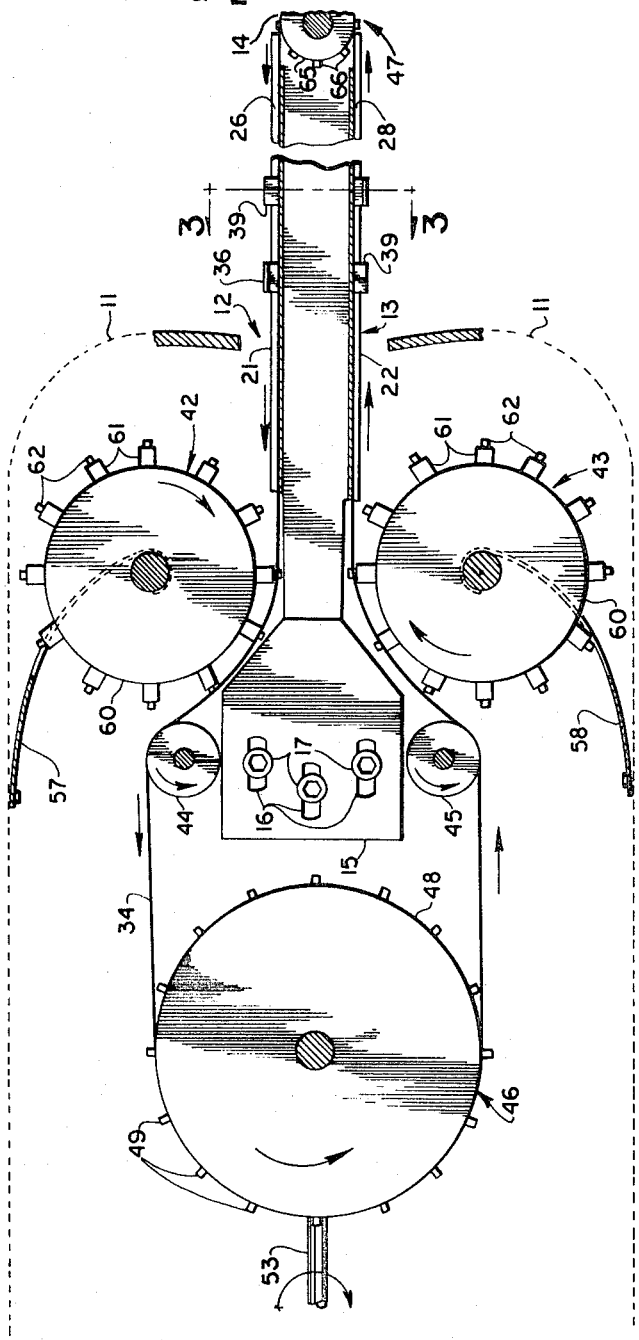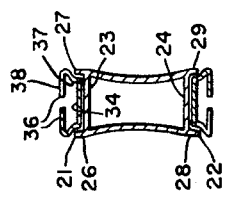

3,750,284

PORTABLE POWER SAW APPARATUS

This invention relates in general to saws and in particular to portable saw apparatus.

The need frequently arises in fabrication and construction for a saw of the so-called keyhole variety which is usable for many purposes and which is especially useful for cutting out a portion of a panel or other surface. For example, a carpenter may need to cut an opening of rectangular or other shape in a wall to permit an object such as a cabinet or the like to be installed therein. While the uses or applications of such saws may be varied, saws of this type generally are required to have a relatively thin elongated blade so that cutting can, if necessary, commence from a relatively small starting hole provided in the interior of a surface to be cut, that is, where the cut does not commence at an outer edge of the surface.

Typical of the prior art saws which have attempted to meet these needs are such devices as the conventional manual keyhole saw, which typically consists of a slender blade with conventional cutting teeth along one edge thereof and a handle at one end, and the well-known saber saw, in which a saw blade of generally conventional design is rapidly reciprocated by an electric motor. The conventional keyhole saw suffers the disadvantage of any manually-operated tool namely, the sawing operation is slow and requires a substantial exertion of physical effort. While these disadvantages may not be important to the occasional user of such saws, it will be apparent that a carpenter or another constant user of such tools would prefer the ease and efficiency of a power operated device. While the conventional saber saw is a power tool, the rapidly reciprocating movement of such saws frequently produces a cut which is less uniform and smooth than the cut provided by the keyhole saw. Yet another disadvantage of such saws is the fact that a separate starting hole must be provided in the surface to be cut, so that the saw blade can be inserted to place the cutting teeth in contact with the surface.

Accordingly, it is an object of the present invention to provide an improved saw.

It is another object of the present invention to provide a power saw of the keyhole type.

It is still another object of the present invention to provide a power saw of the keyhole type which provides unidirectional saw blade movement.

It is still another object of the present invention to provide a saw of the keyhole type which is capable of providing its own starting hole in certain materials.

Other objects and many of the attendant advantages of the present invention will become more readily apparent from the following description of a working embodiment, including the annexed drawing in which:

FIG. 1 is a plan view partially broken away and showing an embodiment of a saw according to the present invention;

FIG. 2 is an elevation view of the saw shown in FIG. 1;

FIG. 3 is a section view taken along line 3—3 of FIG. 2;

Figure 5:
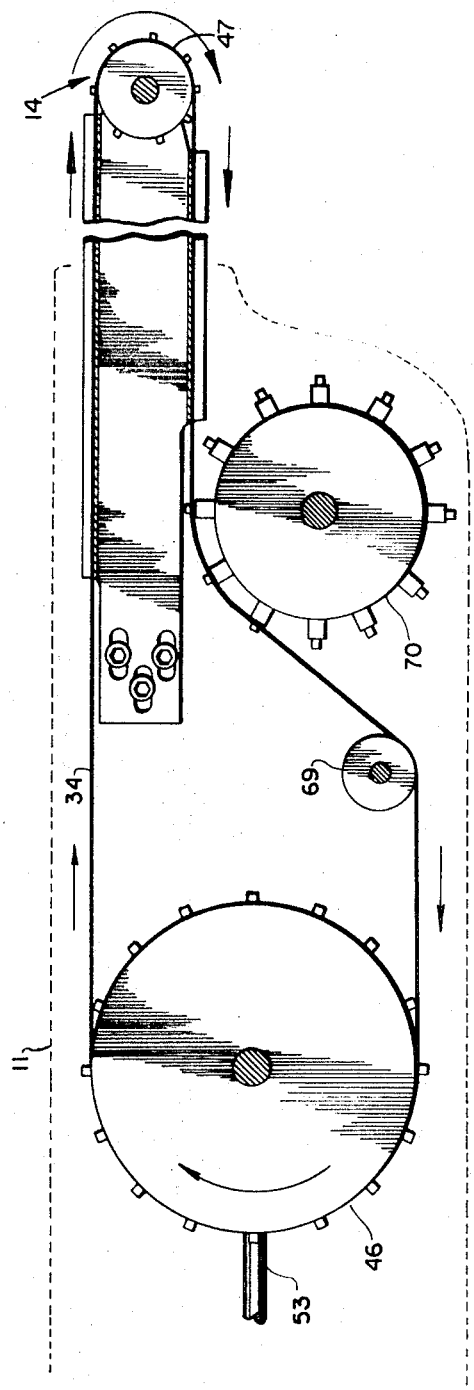
FIG. 5 shows an elevation view of a saw according to a second embodiment of the present invention.

Stated in general terms, the saw of the present invention includes a blade guide extending outwardly from a blade drive housing and defining a channel along which a band-like saw blade can move for continuous or unidirectional movement. The saw blade band includes a number of cutting members which extend outwardly of the band at a substantial angle thereto and which include a cutting edge aligned for cutting engagement with a work piece to be cut by the saw. Motive power for driving the saw blade can be advantageously supplied through an external source such as a portable drill motor coupled to the saw.

More particularly and with reference taken to the embodiment of the present invention as shown in FIGS. 1-4, there is shown portable saw apparatus indicated generally at 10 and including a housing shown diagrammatically at 11 having an opening 12 on one side thereof to accommodate the passage of a blade guide 13 extending outwardly a distance from the housing. The blade guide 13 is adjustably attached to the housing 11 to permit the distance between the housing and the outer end 14 of the blade guide to be varied for a purpose described below. This adjustable attachment is provided in the disclosed embodiments through a plate 15 secured to the inner end of the blade guide 13 and containing a number of elongated slots 16 through which a corresponding number of bolts 17 pass for threaded engagement with a suitable location on the housing 11.

The blade guide 13 is constructed to appear in cross-section, as shown in FIG. 3, somewhat like the letter H with an enlarged horizontal member connecting the two vertical lines of the H. This construction of the blade guide 13 provides a blade channel having a first channel portion 21 and a second channel portion 22, each of which somewhat resembles a U in cross-section and each of which has a blade support surface 23 and 24, respectively. Extending outwardly from the blade support surfaces 23 and 24 are side walls 26, 27 and 28, 29.

Figure 4:
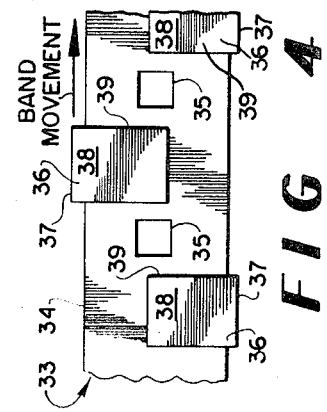
FIG. 4 is a fragmentary plan view of an embodiment of the saw blade as used in the saw shown and described herein.

Disposed within the first and second channel portions 21 and 22 of the blade guide 13 is a saw blade in the form of a continuous band 34 having a number of periodically-spaced openings 35. It can be seen especially in FIG. 2 that the band 34 is a continuous closed loop, and the openings 35 are periodically spaced along the entire length of the band. The saw blade includes a plurality of cutting members 36, as best shown in FIGS. 3 and 4, which are disposed in staggered spaced apart relation relative to the band 34. In the disclosed embodiment of the present invention, each of the cutting members 36 is unitary with the band 34 and is formed to have a riser portion 37 extending substantially perpendicularly to the band 34, and a blade portion 38 disposed in a plane substantially parallel with the band 34 and spaced apart therefrom. The forward or cutting edge 39 of each blade portion 38 is suitably sharpened to accomplish the actual material cutting operation of the saw blade. Each of the risers 37 extends outwardly slightly from the respective edge of the band 34 in the disclosed embodiment. The blade portions 38 are sufficiently long to permit the ends of adjacent blades to overlap, as shown in FIG. 4, although the blades in FIG.

3 are shown deliberately shortened to facilitate illustration of the disclosed embodiment.

The closed path of the band 34 is additionally defined, in the first depicted embodiment of the present invention, by a pair of outside idler wheels 42 and 43, a pair of inside idler wheels 44 and 45, by a drive wheel 46, and by an inside idler wheel 47 disposed at the outer end 14 of the blade guide 13 to operate as a bridge in the path of the band from the first channel portion 31 to the second channel portion 22. Considering first the construction of the drive wheel 46, this wheel has a peripheral surface 48 including a number of tooth-like projections 49 extending radially therefrom. The peripheral spacing of the projections 49 is selected to be identical to the spacing between each of the openings 35 formed in the band 34, and it can be seen that rotation of the drive wheel 46 with the tooth-like projections 49 engaged in openings 35 of the band 34 will impart unidirectional motion to the saw blade. The drive wheel 46 may be journalled for rotation on a fixed shaft 50 contained within the housing 11, and rotational movement may be imparted to the drive wheel through a bevel gear 51 meshing with a corresponding bevel gear face 52 associated with the drive wheel 46. The bevel gear 51 is attached for rotation with the input shaft 53 which, as shown in greater detail below, may extend outside of the housing 11 to be secured in the chuck of a power tool such as a conventional portable electric drill.

As an alternative to the arrangement of bevel gears 51 and 52 shown in FIG. 1, these gears may be replaced by a conventional unitary right-angle drive unit having an input shaft corresponding to shaft 53 and an output shaft connected to rotate the drive wheel 46.

Each of the inside idler wheels 44 and 45 comprises a wheel mounted for rotation as the band 34 passes thereover and having a suitable groove or other indentation disposed around the periphery thereof to accept passage of the band and to maintain the proper tracking of the band.

One or both of the wheels 42 and 43 may be resiliently mounted as by springs 57 and 58. Since each of the outside idler wheels 42 and 43 must operate to change the direction of movement of the band 34 without contacting the cutting members 36 which project outwardly from the band, these outside idler wheels have a peripheral surface 60 from which a plurality of land members 61 radially extend a distance which is at least equal to the distance by which the blade portions 38 of the cutting members 36 are spaced outwardly from the band 34. Each of the land members 61 has a tooth-like projection 62 extending radially outwardly therefrom, with the outwardly-facing peripheral area of each land member 61 being greater than the area of the corresponding tooth-like projection 62 to provide on each land member an area of support which contacts the outer surface of the band 34 as the respective land member is moved by rotation of the idler wheels 42 and 43 into contact with the band. It will thus be understood that each of the cutting members 36 which extends outwardly from the band 34 will pass between two adjacent land members 61 without contacting the peripheral surface 60 of the idler wheel; accurate registration between band 34 and the idler wheels 42 and 43 is maintained through engagement of the projections 62 with the openings 35 in the band.

The idler wheel 47 disposed at the outer end 14 of the blade guide 13 includes a peripheral surface 65 having a number of tooth-like projections 66 extending radially outwardly therefrom, and so it can be seen that the idler wheel 47 resembles a scaled-down version of the drive wheel 46. As best shown in FIG. 2, the diameter of the peripheral surface 65 and the placement of the idler wheel 47 in the blade guide 13 are chosen so that the bottom 23 of the first channel portion 21 and the corresponding bottom of the second channel portion 22 are at least approximately tangentially aligned with the peripheral surface 65 of the idler wheel 47. This arrangement provides a substantially uniform path of travel for the band 34 moving outwardly along the second channel portion 22 onto the idler wheel 47 and then back along the first channel portion 21. Although the idler wheel 47 is shown provided with tooth-like projections 46 to insure that this idler wheel rotates to assist movement of the band, these projections 66 can be eliminated if desired and the idler wheel 47 can be provided with a grooved peripheral surface to accommodate passage of the band 34, in the manner described previously with reference to the inside idler wheels 44 and 45.

The spacing of the riser portion 37 is chosen to be greater than the distance by which the side walls 26 extend outwardly from the bottom surface 23 of the blade channel. Accordingly, it can be seen that movement of the band 34 along the blade guide 13 causes the progression of forward edges 39 to move extending outwardly of the blade guide, as seen in FIG. 2. These forward edges 39, when brought to bear against a wall panel or another work piece to be cut, provide the requisite sawing action. The space between each of the blade portions 38 and the band 34 provides adequate clearance for self-removal of sawdust and other particles developed during the sawing process. It can also be seen that the blade portions 38 and the forward edges 39 thereof extend outwardly from the idler wheel 47 as the blade passes around that wheel; this exposed movement of the forward edges 39 at the outer end of the blade guide 13 provides the saw of the present invention with the capability of cutting its own starting opening in surface materials, such as drywall and relatively thin wood paneling, simply by placing the outer end 14 of the blade guide in firmly held position against the material to be cut and operating the saw. Installation and removal of the saw blade is accomplished by loosening the bolts 17 and moving the blade guide inwardly of the housing.

A second disclosed embodiment of the present invention, as seen in FIG. 5, provides a somewhat simplified arrangement and construction of the saw in which only a single inside idler wheel 69 and a single outside idler wheel 70 are requird. The overall configuration of the saw resembles that of a pistol, and other details of the saw including the design of the idler wheels 69 and 70 remain substantially unchanged from those described with reference to the first described embodiment of the present invention.

Figure 6:
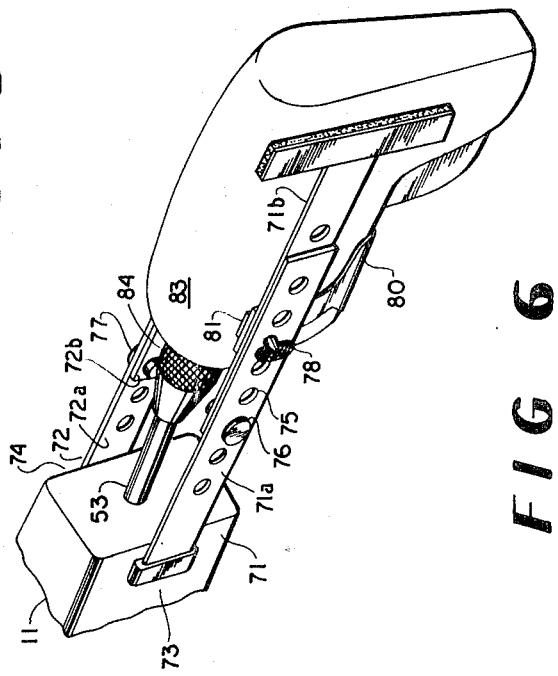
FIG. 6 shows a partial isometric view of the saw and driving motor attachment according to an embodiment of the present invention.

Referring now to FIG. 6, a pair of strap members 71 and 72 are pivotally connected to opposing sides of the housing 11 at locations 73 and 74 thereon. Each of the strap members 71 and 72 includes a first strap portion 71a and 72a, respectively, connected for pivotal movement at the respective locations 73 and 74, and further comprises second strap portions 71b and 72b, respectively. A plurality of adjustment holes 75 is provided along the portions 71a, 71b and along 72a, 72b, so that the spacing between the housing 11 and the second portions 71b, 72b can be selectively varied.

Interconnection between the first and second portions of the strap members 71 and 72 is provided with a pair of studs 76 and 77, which are received through appropriate aligned holes 75 in the respective strap member portions, and with a pair of wing nuts one of which is shown at 78 and the other of which is hidden from view by the drill motor 83. The wing nuts also pass through appropriate aligned pairs of holes 75 and through respective aligned internally threaded holes in the collar member 80. A pair of pressure pads, one of which is shown at 81, is swivelably connected to the respective ends of the wing nuts in positioned relationship to be brought to bear against the sides of a suitable power source such as a conventional portable drill motor 83 which is connected through the drill chuck 84 to the shaft 53 of the saw.

The collar 85 extends beneath the drill 83 for support purposes and, if considered necessary or desirable, a similar collar (not shown) can be provided to extend around the upper half of the drill motor.

In attaching a conventional drill motor 83 to the saw of the present invention in the manner depicted in FIGS. 7 and 8, the chuck 84 of the drill is first suitably clamped onto the shaft 53 which emerges from the housing 11 of the saw. The strap members 71 and 72 are then suitably positioned by means of the first and second portions thereof so that the pressure pads connected to the wing nuts are suitably disposed to be traversed into clamping engagement with respective sides of the drill motor 83, with this clamping engagement of the drill motor 83 between the strap members 71 and 72, and additionally within the collar 85, the drill motor is securely affixed into position relative to the housing 11 of the saw; the user of the saw can grasp the drill motor 83 with his right hand (assuming a right-handed user) and can grasp the housing 11 with a suitable handle (not shown) to accomplish the desired sawing operation.

Although the herein-disclosed embodiments of the present invention are designed to be used with an external source of power such as a portable drill motor, it will be understood by those skilled in the art that a self-contained motor can be disposed within the housing 11 along with suitable reduction gearing to provide a saw according to the present invention which is complete within itself and which need only be plugged into a suitable source of electric power for its operation. It will also be apparent that various attachments conventionally used with saws, such as angle-cutting guides and the like, can be applied as well to the saw of the present invention so that special-purpose cuts such as beveled surfaces and the like can be provided. As a specific example, a depth-of-cut stop member applied extending outwardly from the blade guide 13 at a predetermined distance spaced from the end 14 (toward the housing 11) can define a maximum depth of cut less than the thickness of the workpiece, thereby enabling the present saw apparatus to be used as a router.

It will be understood, of course, that the foregoing relates only to preferred embodiments of the present invention and that numerous alterations and modifications may be made therein without departing from the spirit and the scope of the invention as contained in the following claims.

What is claimed is:

1. Saw apparatus comprising:
housing means;
blade guide means extending from said housing means to terminate at a spaced location therefrom;
saw blade channel means formed along said blade guide means;
saw blade means disposed for sliding movement along said channel means of said blade guide means;
said saw blade means comprising a substantially flat endless flexible band member;
said channel means comprising a saw blade support surface forming an elongate slot defined by a blade support surface and by means extending from said blade surface to define wall means of said channel means;
a plurality of cutting members carried by said saw blade means;
each of said cutting members having a cutting edge disposed in spaced apart relation from said band member of said saw blade means to extend said cutting edge outside of said channel means for cutting exposure to material positioned adjacent to said blade guide means; and
motive means disposed in said housing means in operative engagement with said saw blade means to impart sliding movement of said saw blade means along said channel means.

2. Apparatus as in claim 1, wherein:
at least some of said cutting members having a portion of said cutting edge offset to extend across said wall means and disposed in a plane which is spaced apart from and substantially parallel to said band member, so that said cutting member portions cut a path of width greater than the width of said blade guide means.

3. Apparatus as in claim 1, wherein:
said motive means comprises drive wheel means in driving engagement with said saw blade means;
said saw blade means having a plurality of drive engagement means spaced at periodically repetitive locations along said band member; and
said drive wheel means having a peripheral region including a plurality of drive means spaced along said peripheral region for driving engagement with said drive engagement means of said saw blade means.

4. Apparatus as in claim 1, wherein:
the width of said band member is less than the width of said channel means; and
at least some of said cutting members extend out of and laterally of said elongate slot to define a saw blade means width which is greater than the width of said band member and greater than the width of said channel means.

5. Apparatus as in claim 4, wherein:
said blade guide means comprises an elongate member having a proximal end disposed adjacent to said housing means and a distal end spaced apart from said housing means;
said channel means extending along a first portion of said elongate member from said proximal end to said distal end and further extending along a second portion of said elongate member from said distal end to said proximal end, said first portion and said second portion being in spaced apart relation to each other; and means disposed at said distal end of said elongate member providing saw blade sliding movement interconnection between said first and second portions of said channel means.

6. Apparatus as in claim 5, further comprising:

drive wheel means in driving engagement with said band member and having a peripheral region including a plurality of drive means spaced along said peripheral region for driving engagement with said band member;

said drive wheel means having a diameter substantially greater than the spacing between said first and second portion of said elongate member;

at least one idler wheel means positioned between said drive wheel means and said proximal end of said elongate member;

said idler wheel means having a peripheral region disposed to be substantially tangentially aligned with one of said first and second portion of said channel means; and said band member being disposed in engagement with said peripheral region of said idler wheel means to be in substantial alignment with said one portion of said channel means.

7. Apparatus as in claim 6, wherein:

said peripheral region of said idler wheel means comprises a plurality of spacer members separated from each other along the circumference of the idler wheel means by undercut regions of sufficient depth to receive said cutting members extending from said saw blade means; and each of said spacer members has band member engaging means disposed thereon for engagement with said band member.

8. Apparatus as in claim 5, further comprising:

adjustable means interconnecting said elongated member and said housing means to vary the spacing between said housing means and said distal end.

9. Apparatus as in claim 1, wherein:

said motive means includes a drive member extending from said housing means for connection with a drive motor;

first pair of spaced apart connective members extending from attachment to said housing means to a spaced apart location therefrom;

second pair of spaced apart connective members selectively interconnected with said first pair of connective members to enable said second pair of connective members to terminate at a selectively adjustable distance from said housing means; and engagement means connected to at least one of said pairs of spaced apart connective members and positioned there-between to holdingly engage a drive motor connected to said coupling means.

10. Apparatus as in claim 9, further comprising:

support means extending between at least one pair of said connective members to form a collar for supporting the drive motor; and each of said second pair of connective members having a portion extending rearwardly from said selective interconnection and into engagement with an exterior location on the drive motor.

* * * * *